(12) United States Patent
Chiu et al.

(10) Patent No.: US 8,126,046 B2
(45) Date of Patent: Feb. 28, 2012

(54) FLEXIBLE MACROBLOCK ORDERING AND ARBITRARY SLICE ORDERING APPARATUS, SYSTEM, AND METHOD

(75) Inventors: Yi-Jen Chiu, San Jose, CA (US); Prasenjit Biswas, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1641 days.

(21) Appl. No.: 11/479,324

(22) Filed: Jun. 30, 2006

(65) Prior Publication Data

US 2008/0056347 A1    Mar. 6, 2008

(51) Int. Cl.
*H04N 7/12* (2006.01)
*H04B 1/66* (2006.01)

(52) U.S. Cl. ................ 375/240.01; 348/425.1

(58) Field of Classification Search ............. 348/384.1, 348/398.1, 404.1, 402.1, 407.1, 425, 416, 348/413; 382/240, 233, 238, 250, 251, 247, 382/232, 239, 248; 375/240.16, 240.24, 375/240.12, 240.19, 240.11, 240.08, 240.01, 375/240.15, 240.14
See application file for complete search history.

(56) References Cited

U.S. PATENT DOCUMENTS

| | | | | |
|---|---|---|---|---|
| 7,469,070 | B2 * | 12/2008 | Winger | 382/239 |
| 7,630,440 | B2 * | 12/2009 | Prakasam | 375/240.25 |
| 7,864,864 | B2 * | 1/2011 | Mehta et al. | 375/240.24 |
| 2006/0083308 | A1 * | 4/2006 | Schwarz et al. | 375/240.16 |
| 2007/0230582 | A1 * | 10/2007 | Chiu et al. | 375/240.24 |
| 2007/0237231 | A1 * | 10/2007 | Sriram et al. | 375/240.13 |
| 2007/0296613 | A1 * | 12/2007 | Hussain et al. | 341/50 |
| 2009/0086827 | A1 * | 4/2009 | Wu et al. | 375/240.27 |

\* cited by examiner

*Primary Examiner* — Behrooz Senfi
(74) *Attorney, Agent, or Firm* — Kacvinsky Daisak, PLLC (57) ABSTRACT

A system, apparatus, method, and article to process a flexible macroblock ordering and arbitrary slice ordering are described. The apparatus may include a video decoder. The video decoder includes a processor to store coding parameters of one or more neighboring macroblocks in a data buffer. The neighboring macroblocks are previously decoded macroblocks and are adjacent to a current macroblock. The processor is to store control parameters for each of the one or more neighboring macroblocks in the data buffer. The processor is to reconstruct coding parameters for the current macroblock using availability information associated with the neighboring macroblocks.

26 Claims, 7 Drawing Sheets

FLEXIBLE MACROBLOCK ORDERING AND ARBITRARY SLICE ORDERING APPARATUS, SYSTEM, AND METHOD

BACKGROUND

Video compression is used in many current and emerging products such as digital television set-top boxes (STBs), digital satellite systems (DSSs), high definition television (HDTV) decoders, digital versatile disk (DVD) players, video conferencing, Internet video and multimedia content, and other digital video applications. Without video compression, digital video content can be extremely large, making it difficult or even impossible for it to be efficiently stored, transmitted, or viewed. Broadcast television (TV) and home entertainment systems have vastly improved in recent years due largely in part by the advent of digital TV and DVD video.

The standardization of video compression (video coding) technology, such as the MPEG (Motion Picture Experts Group) series of compression standards make these and other applications possible. The new MPEG4 standard in the MPEG series is enabling Internet-based video applications, while the International Telecommunications Union (ITU) Telecommunication Standardization Sector (ITU-T) H.263 video compression standard is now widely used in videoconferencing systems. The most recent international standard for video image encoding/decoding and compression to be widely pursued by industry is the International ITU-T International Organization for Standardization (ISO) video compression standard known as ITU-T/ISO H.264 or as advanced video codec (AVC) and MPEG-4 Part 10 ("H.264 standard" hereinafter). The H.264 standard was prepared by the Joint Video Team (JVT), which included the ITU-T SG16 Q.6, known as VCEG (Video Coding Expert Group), and the ISO/IEC JTC1/SC29/WG11, known as MPEG. The H.264 standard is designed for the applications in the area of Digital TV broadcast (DTV), Direct Broadcast Satellite (DBS) video, Digital Subscriber Line (DSL) video, Interactive Storage Media (ISM), Multimedia Messaging (MMM), Digital Terrestrial TV Broadcast (DTTB), and Remote Video Surveillance (RVS), among other video compression applications. Others standards include, the Joint Scalable Video Codec (JSVC/H.264 Amendment 3) (H.264 Amendment 3), VC1, China AVS, and the legacy video codec standards such as MPEG-4 Part 2 Versions 1 and 2, MPEG-2, MPEG-1, H.263, and H.261.

These video codec techniques are block based coding techniques that operate on macroblocks of pixels. These block based techniques utilize transform coding and entropy coding on the residue of a motion compensated block. A macroblock may include 16×16 luma pixels. In some standards, a macroblock may be further partitioned into 16×8, 8×16, and 8×8 blocks of pixels. In accordance with the H.264 standard, each 8×8 block, called sub-macroblocks, can be further divided into smaller blocks such as 8×4, 4×8, and 4×4 blocks of pixels.

Higher coding efficiency may be achieved by utilizing the spatial correlation between blocks. Video codec standards usually provide the use of previously decoded neighboring blocks to decode a current macroblock. Specifically, the coding parameters for the reconstruction of the motion vector, intra prediction, content adaptive binary arithmetic coding (CABAC), and macroblock property reconstruction of the current macroblock require the associated information from the previously reconstructed adjacent macroblocks.

In the H.264 standard, the task of reconstructing the coding prediction parameters becomes more complicated due to the flexible macroblock ordering (FMO) and arbitrary slice ordering (ASO) properties. FMO allows a picture to be divided into various scanning patterns such as interleaved slice, dispersed slice, foreground slice, leftover slice, box-out slice, and raster scan slice. ASO allows the slices of a picture to be coded in any relative order. With FMO and ASO, the decoding order of an H.264 standard picture may no longer be in the traditional macroblock raster scan order of the picture. As a result, the design of reconstructing coding parameters and macroblock decoding techniques for H.264 standard video remain challenging tasks. Conventional H.264 standard video codec techniques are implemented in accordance with the concepts from the JM reference software of the H.264 standard committee. The JM reference software, however, utilizes a global data buffer to store the information associated with the decoded macroblock parameters for an entire picture. The retrieval of reference data for decoding the video of the FMO and ASO coding modes requires frequent accesses to an external memory that stores the information from the global data buffer at every macroblock level. Frequent accesses to the external memory at the macroblock level are very costly in hardware implementations. Accordingly, there may be a need for a scheme to reconstruct video coding parameters using FMO and ASO techniques.

DETAILED DESCRIPTION

The various described embodiments provide techniques to reconstruct video coding parameters. In the various described embodiments these techniques provide a reference data buffer structure to store neighboring macroblock coding data that may be used as the reference data for decoding current macroblocks. These techniques also provide the stored macroblock control parameters and the associated macroblock level management processing to access/store the macroblock control parameters that may be required to reconstruct the coding parameters. One embodiment provides video decoding in the macroblock decoding order upon receiving an H.264 standard video bitstream compressed in the FMO and/or ASO coding modes. The various described embodiments provide techniques to reduce both the size of the storage data buffer and the computational complexity of managing the reference data for compressed digital video. In various embodiments, these techniques may be implemented in accordance with the FMO/ASO coding modes provided in the H.264 standard. Additional embodiments may be applied to various hardware/software based architectures.

Accordingly, the various described embodiments provide apparatuses, systems, and methods to optimize various operations to reconstruct the coding parameters for various modes of a video decoder. Some embodiments, for example, optimize the operations to reconstruct the coding parameters for the FMO and/ASO coding odes of an H.264 standard and the JSVC/H.264 Amendment 3 video decoder. The embodiments may provide an efficient architecture to decode an H.264 standard video bitstream in macroblock decoding order in accordance with the FMO and ASO coding modes. In one embodiment, the architecture may comprise a macroblock level management module and a compact reference data buffer for storing the coding parameters of previously decoded neighboring macroblocks.

The various described embodiments may provide multiple components and elements. For example, one embodiment provides a mechanism and/or technique to reconstruct the coding parameters required for decoding H.264 standard video bitstreams. One embodiment provides a mechanism and/or technique to reconstruct coding parameters that may be required for decoding the FMO and/or ASO coding modes of H.264 standard video bitstreams. One embodiment provides a mechanism and/or technique to reconstruct the coding parameters that may be required for decoding the FMO and/or ASO coding modes in the macroblock decoding order of H.264 standard video bitstreams. One embodiment provides a mechanism and/or technique to reduce the computational complexity of reconstructing coding parameters by providing a data buffer for a row of macroblocks (for non-MBAFF) or for a row of macroblock-pairs (for MBAFF) where MBAFF stands for macroblock adaptive frame-field coding mode in accordance with the H.264 standard. And, one embodiment provides a mechanism and/or technique to reduce the computational complexity of reconstructing coding parameters for the FMO/ASO coding modes by providing the stored macroblock control parameters and the macroblock level management process to access/store the macroblock control parameters.

Accordingly, various embodiments are described to decode H.264 video bitstreams in the FMO/ASO coding mode. Unlike other methods that utilize a global data buffer to hold the reference data for an entire picture, the described embodiments provide a compact data buffer, with a buffer size of approximately 3%, or in some embodiments approximately 2.96%, for high definition video, compared to buffer sizes employed in conventional approaches. The described embodiments provide stored macroblock control parameters and associated macroblock level management processing to efficiently decode the FMO/ASO video in the macroblock decoding order. The various described embodiments may be applicable to many hardware/software based architectures and implementations, including, for example, the H.264 standard Intel Performance Primitive (IPP) library made by the Intel® Corporation.

The various described embodiments provide an efficient architecture to manage the retrieval of reference data that may be required for decoding an H.264 standard video coded in the FMO and ASO coding modes. In accordance with the various described embodiments, the task of decoding the FMO and ASO video may be executed efficiently in the macroblock decoding order without the need for global data buffering. The size of the reference data buffer may be reduced. The storage requirements may include a row of macroblocks for the non-MBAFF mode and a row of macroblock-pairs for the MBAFF mode. As a result, for embodiments comprising high definition video of the size of 1920*1080, for example, one embodiment of the storage buffer may have a size of approximately 1.48% for the non-MBAFF mode and approximately 2.96% for the MBAFF mode relative to the conventional JM reference software techniques. Also, the complexity of the described macroblock management processing may be reduced to approximately less than 40 cycles per macroblock, for example.

Although the FMO, ASO, MBAFF, and non-MBAFF are features associated with the H.264 standard video coding/decoding, the various described embodiments also may apply to other video compression standards such as, for example, VC-1 (where VC-1 is the informal name of the SMPTE standard 421 M describing a video codec based on Windows® Media Video version 9, and where SMPTE stands for Society of Motion Picture and Television Engineers), China audio video standard (AVS), MPEG-4 Part 2 Versions 1 and 2, H.263, and H.263+ which may comprise relatively simpler prediction schemes for a neighboring block when decoding a current macroblock.

The various described embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
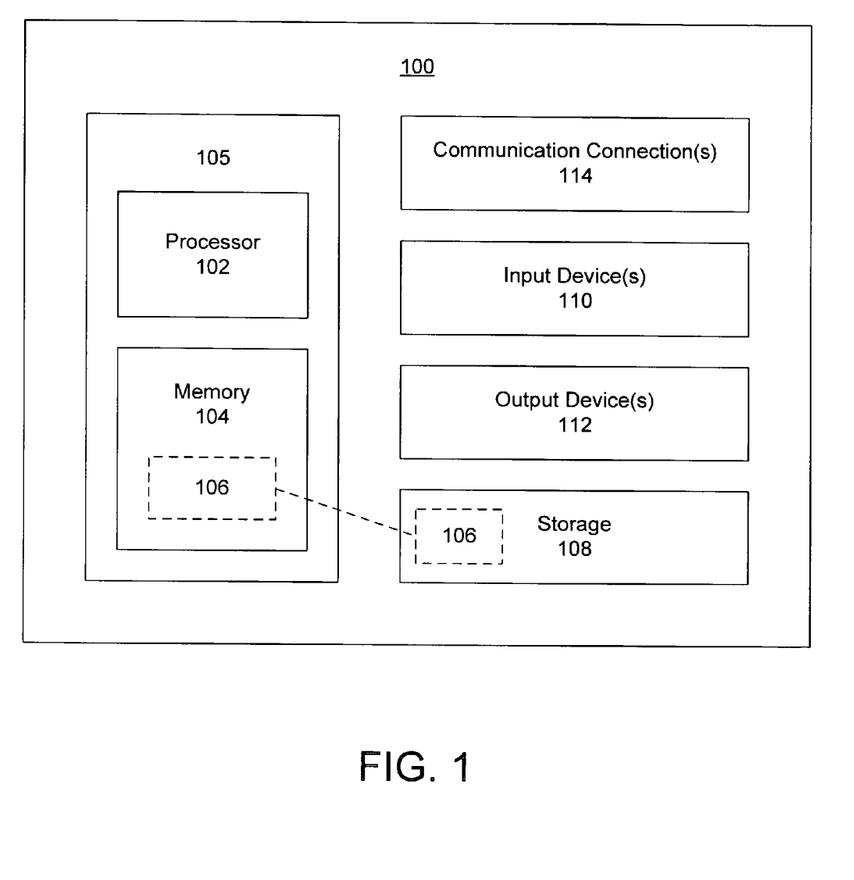
FIG. 1 illustrates one embodiment of a suitable computing environment in which several of the described embodiments may be implemented.

FIG. 1 illustrates one embodiment of a suitable computing environment 100 in which several of the described embodiments may be implemented. The computing environment 100, however, is not intended to suggest any limitation as to scope of use or functionality, as the techniques and tools may be implemented in diverse general-purpose or special-purpose computing environments. Accordingly, in one embodiment, the computing environment 100 may comprise a processor 102, and memory 104. In one embodiment, a basic computing environment 105 comprises the processor 102 and the memory 104. The processor 102 may comprise one or more processors. The processor 102 executes computer-executable instructions and may be a real or a virtual processor. In a multi-processing system, multiple processors execute computer-executable instructions to increase processing power, for example. The memory 104 may be a volatile memory (e.g., registers, cache, RAM), non-volatile memory (e.g., ROM, EEPROM, flash memory, etc.), or some combination of the two. The memory 104 stores software 106 to implement a chroma motion vector reconstruction video encoder or decoder to pre-compute the chroma vector adjustment vectors at the slice layer and to reduce the computational complexity for chroma motion vector reconstruction. The memory 104 may be organized to store data buffers such as neighbor data buffer (NDB) structures for non-MBAFF and MBAFF coding modes described below. The embodiments, however, are not limited to the elements or the arrangement shown or described in FIG. 1.

In one embodiment, the computing environment 100 also may comprise storage 108, one or more input devices 110, one or more output devices 112, and one or more communication connections 114. An interconnection mechanism (not shown) such as a bus, controller, or network interconnects the components of the computing environment 100. Operating system software (not shown) provides an operating environment for other software executing in the computing environment 100, and coordinates activities of the components of the computing environment 100.

The storage 108 may comprise removable or non-removable media, and includes magnetic disks, magnetic tapes or cassettes, CD-ROMs, DVDs, or any other medium which can be used to store information and which can be accessed within the computing environment 100. The storage 108 stores instructions for the software 106 to implement the video encoder or decoder in accordance with the embodiments described herein.

The input device(s) 110 may comprise a touch input device such as a keyboard, mouse, pen, or trackball, a voice input device, a scanning device, or another device that provides input to the computing environment 100. For audio or video encoding, the input device(s) 110 may be a sound card, video card, TV tuner card, or similar device that accepts audio or video input in analog or digital form, or a CD-ROM or CD-RW that reads audio or video samples into the computing environment 100. The output device(s) 112 may comprise a display, printer, speaker, CD-writer, or another device that provides output from the computing environment 100.

The communication connection(s) 114 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media may include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100, computer-readable media may include memory 104, storage 108, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Figure 2:
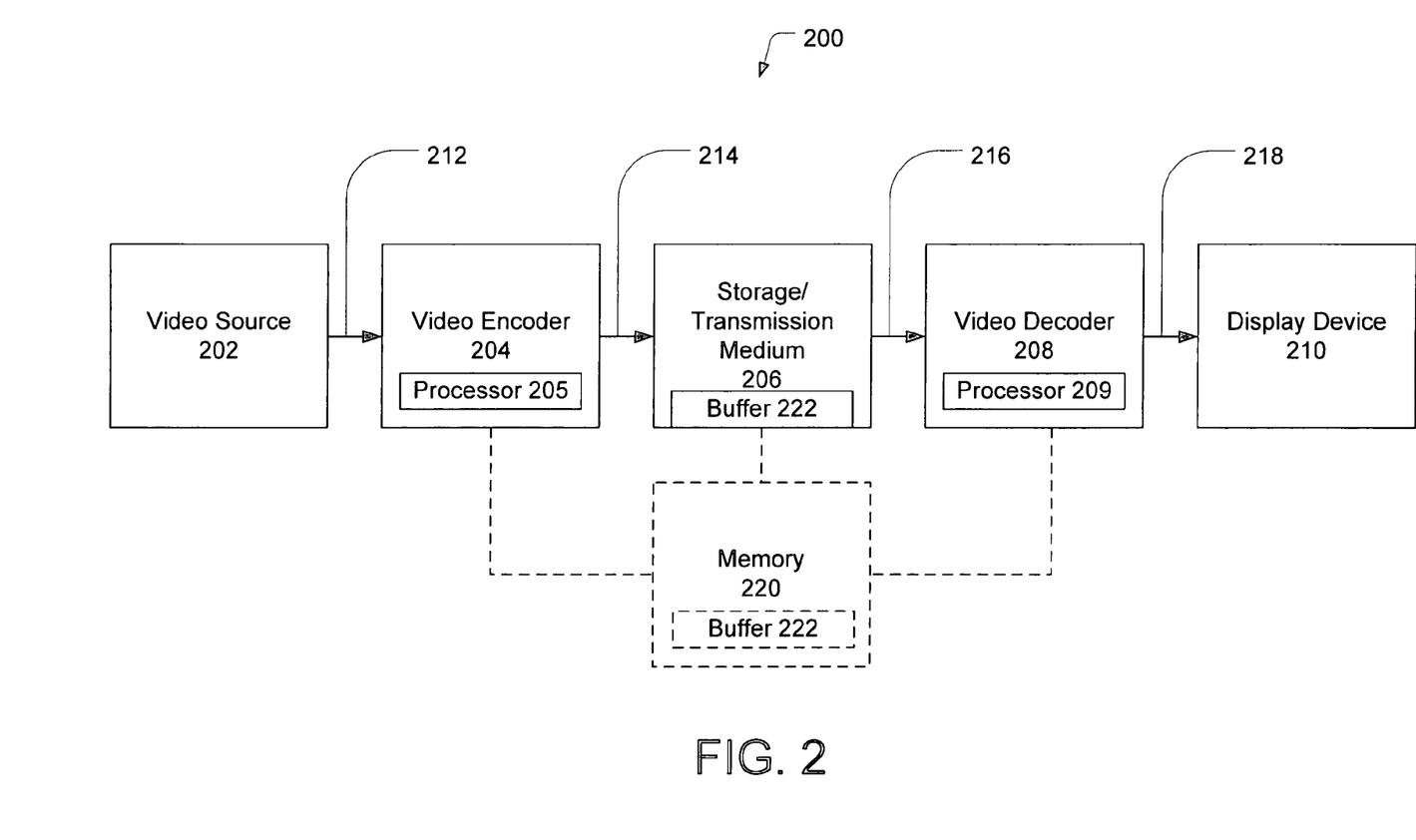
FIG. 2 illustrates one embodiment of a video encoding/decoding system in which several of the described embodiments may be implemented.

FIG. 2 illustrates one embodiment of a video encoding/decoding system 200 in which several of the described embodiments may be implemented. In one embodiment, the video encoding/decoding system 200 may comprise an H.264 standard video encoder/decoder processing system, although the embodiments are not limited in this context. For example, the video encoding/decoding system 200 may be suitable to encode, decode, transmit, store, and reconstruct video in accordance with the various techniques described herein. The system shown in FIG. 2 may comprise a video source 202, a video encoder 204, a storage/transmission medium 206, a video decoder 208, and a display device 210. Other components or elements such as processor 205 and processor 209 may be provided, for example, to implement the functionality of the respective video encoder 204 and the video decoder 208. The storage/transmission medium 206 may store and/or transmit or receive digital video information. In one embodiment, a memory 220 may be provided for temporary storage of picture frame information, for example. The storage/transmission medium 206 and/or the memory 220 may store data buffers 222 such as the NDB structures for non-MBAFF and MBAFF coding modes in accordance with the various embodiments described below. Any of the video encoder 204, video decoder 208, and/or storage/transmission medium 206 may be implemented utilizing elements of the computing environment 100 shown in FIG. 1. The embodiments, however, are not limited to the elements or the arrangement shown or described in FIG. 2.

The original, full information content video signal, e.g., in analog format, may be provided to the video source 202. The video source 202 may perform various functions such as, digitization of the video signal into a luminance (luma) and chrominance (chroma) format, e.g., YCbCr, YUV, YIQ, and YCC family of color spaces. Those skilled in the art will appreciate that for the YCbCr color space Y is the luma component and Cb and Cr are the chroma components; for the YUV color space Y is the luma component and U and V are the chroma components; for the YIQ color space Y is the luma component and I and Q are the respective in-phase and quadrature chroma components; and for the YCC color space Y is the luma component and C (Cb) and C (Cr) are the chroma components. The video source 202 provides the formatted digitized luma and chroma video signals to the video encoder 204. Regardless of the particular video format, the video source 202 performs the necessary processing to supply a full-information digital video signal version of the original analog video signal to the video encoder 204. In various embodiments, the video source 202 may be a transmission medium or a stored file. The video source 202 may provide the digital video signal sequences in the form of picture frames to the encoder 204.

The coding structure of the H.264 standard is similar to that of prior major digital video standards such as, for example, H.261, MPEG-1, MPEG-2/H.262, H.263 or MPEG-4 part 2. The architecture and the core building blocks of the video encoder 204 also may be based on motion-compensated transform coding. For example, each picture may be compressed by partitioning it as one or more slices, where each slice comprises one or more macroblocks. Macroblocks may be defined as blocks of 16×16 luma pixels (or samples) with corresponding chroma samples. Each macroblock also may be divided into one or more sub-macroblock partitions for motion-compensated prediction as shown below in FIGS. 4A-F, for example. The prediction partitions may comprise blocks of pixels of multiple different sizes, such as, for example, 16×16, 16×8, 8×16, 8×8, 8×4, 4×8, and 4×4 pixels. Motion compensation may be applied to an entire macroblock or may be applied to 16×16 or 8×8 pixel partitions. In one embodiment, the 8×8 pixel partition or sub-macroblock may be the smallest available size for processing. The latter may provide enhanced prediction accuracy. The spatial transform for the residual data may be either 8×8 or 4×4 pixels, for example. A hierarchy of a video sequence from sequence to samples may be given by:

sequence (pictures (slices (macroblocks (macroblock partitions (sub-macroblock partitions (blocks (samples)))))).

Additional structures such as packetization schemes and channel codes, among others, also may be provided. These structures may relate to the delivery of the video data bitstream, among other data bitstreams such as audio. Because video compression tools work primarily at or below the slice layer, bits associated with the slice layer and below may be identified as Video Coding Layer (VCL) data and bits associated with higher layers are identified as Network Abstraction Layer (NAL) data.

The video encoder 204 receives the digital video signal sequence 212 from the video source 202 in the form of video input frames. The encoder 204 compresses the video input frames and passes compressed video bits 214 in the form of a bitstream to the storage/transmission medium 206 (and/or the memory 220). In one embodiment, the compression may be performed in accordance with the H.264 standard specification and the output bitstream may be an H.264 standard bitstream. The video encoder 204 receives video input frames for encoding. The frames are processed in units of a macroblock corresponding to blocks of 16×16 pixels in the original image. Each macroblock is encoded. A prediction macroblock is formed based on a reconstructed frame. In one mode, the prediction macroblock may be formed from samples in a current frame that were previously encoded, decoded, and reconstructed. In another mode, the prediction macroblock may be formed by motion-compensated prediction from one or multiple reference frames. The prediction macroblock is subtracted from the current macroblock to produce a residual or difference macroblock. Using a block transform, the residual or difference macroblock is transformed and quantized to provide a set of encoded coefficients in addition to other information required to decode the macroblock and to form a compensated bitstream. The other information may comprise, e.g., macroblock prediction mode, quantizer step size, motion vector information describing how the macroblock was motion-compensated, among others. The compensated bitstream may be passed to the storage/transmission medium 206 for transmission and storage.

The storage/transmission medium 206 provides a method and medium by which the encoded video signal eventually may be supplied to the video decoder 208. For example, the storage/transmission medium 206 may be a digital communication system. Alternatively, the storage/transmission medium 206 may be an arrangement that includes a disk writer, a disk that is written with the encoded video signal by the disk writer, and a disk reader that retrieves the encoded video signal from the disk, for example.

The video decoder 208 receives an encoded/compressed digital video signal 216 in the form of a bitstream comprising the compressed video bits 214 from the storage/transmission medium 206 (and/or the memory 220 and/or the video encoder 204) and decodes it to produce a decoded video signal 218 that is supplied to the display device 210. In one embodiment, the encoded/compressed video signal 216 may be in the form of an H.264 standard specification bitstream. In general principle, the video decoder 208 conceptually works in reverse to the video encoder 204 and may comprise primarily an entropy decoder among various other processing elements. The video signal 214 produced by the video decoder 206 may be identical to the signal supplied to the video encoder 204 if the video encoder 204 employs a lossless encoding method. The video signal 214 produced by the video decoder 206 may differ somewhat from the signal supplied to the video encoder 204 if the video encoder 204 employs a lossy encoding method, e.g., an MPEG-like encoding method.

In operation, one embodiment of the system 200 illustrated in FIG. 2 may be configured to perform digital video processing in accordance with the H.264 standard specification. For, example, in one implementation, the video encoding/decoding system 200 may be configured and adapted to provide a mechanism and/or technique to reconstruct the coding parameters required for decoding H.264 standard video bitstreams. In one embodiment, the system 200 may be configured and adapted to provide a mechanism and/or technique to reconstruct coding parameters that may be required for decoding the FMO and/or ASO coding modes of H.264 standard video bitstreams. In one embodiment, the system 200 may be configured and adapted to provide a mechanism and/or technique to reconstruct the coding parameters that may be required for decoding the FMO and/or ASO coding modes in the macroblock decoding order of H.264 standard video bitstreams. In one embodiment, the system 200 may be configured and adapted to provide a mechanism and/or technique to reduce the computational complexity of reconstructing coding parameters by providing a data buffer for a row of macroblocks for non-MBAFF or for a row of macroblock-pairs for MBAFF coding modes. And, in one embodiment, the system 200 may be configured and adapted to provide a mechanism and/or technique to reduce the computational complexity of reconstructing coding parameters for the FMO/ASO coding modes by providing the stored macroblock control parameters and the macroblock level management process to access/store the macroblock control parameters. As previously discussed, one embodiment of a suitable platform for implementing a H.264 standard video decoder is computing system 100 shown in FIG. 1.

Figure 3A:
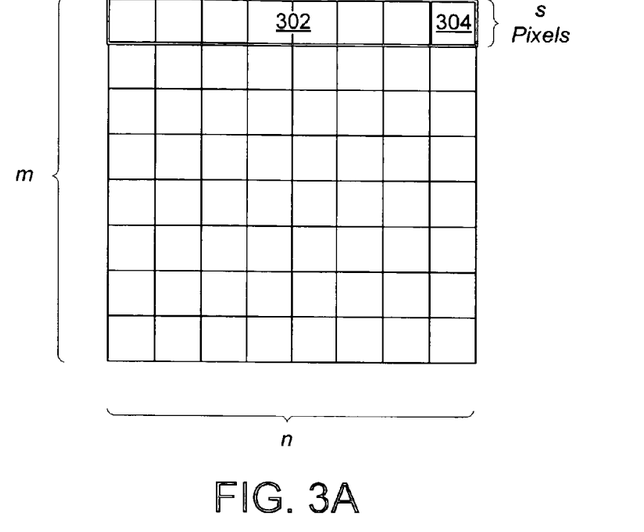
FIG. 3A illustrates one embodiment of a picture divided into slices.

FIG. 3A illustrates one embodiment of a picture 300 divided into slices 302. A slice 302 comprises a group of macroblocks 304. When the picture 300 is already decoded, it may be referred to as a decoded reference picture comprising associated slices 302 and macroblocks 304. Reference indices may point to a reference picture contained in a reference lists. The H.264 standard video compression provides two reference lists for each reference picture. When a macroblock 304 or sub-macroblock (e.g., as shown in FIGS. 4A-F) is to be encoded in a current picture 300, the slice 302 may be referred to as the current slice and the macroblock (or sub-macroblock) may be referred to as a current macroblock (or sub-macroblocks). Throughout this description, a macroblock and/or a sub-macroblock may be referred to generally as a "block" for the sake of simplicity. A block is a rectangular group of pixels. As illustrated in FIG. 3A, the macroblock 304 is a rectangular group of pixels. As shown in FIG. 3A, the size of the macroblock 304 is r×s pixels. In one embodiment, r=s=16 and the macroblock 304 is comprises 16×16 pixels, for example. In accordance with the H.264 standard, the macroblock 304 may comprise r×s luma pixels. In various embodiments, the picture 300 may comprise m slices 302 and n macroblocks 304 per slice. As illustrated in FIG. 3A, the number of macroblocks 304 per picture (m×n) is generally much greater than the number of slices per picture (m). In one embodiment, for example, in high-definition video applications, the number of macroblocks 304 per picture 300 (m×n) is 8160 (e.g., for a picture size of 1920×1080) and the number (m) of slices 304 per picture 300 may vary from 1 to 8 slices, for example. The embodiments, however, are not limited to the elements or the arrangement shown or described in FIG. 3A.

At the block 304 (macroblock or sub-macroblock) processing level, a chroma motion vector adjustment is calculated for the vertical motion vector component if necessary. Each of the blocks 304 comprises a field parity property that defines the current block 304 as a field block or a frame block. According to the H.264 standard, for example, video compression may be accomplished in a video encoding, or coding, process in which the picture 300 is encoded as either a frame or as two fields. Each frame comprises a number of lines of spatial information. For example, a typical frame may contain 480 horizontal lines. Each field may contain half the number of lines in the frame. For example, if the frame comprises 480 horizontal lines, each field comprises 240 horizontal lines. In a typical configuration, one of the fields comprises the odd numbered lines in the frame and the other field comprises the even numbered lines in the frame. The field that comprises the odd numbered lines will be referred to as the "top" field hereafter and in the appended claims, unless otherwise specifically denoted. Likewise, the field that comprises the even numbered lines will be referred to as the "bottom" field hereafter and in the appended claims, unless otherwise specifically denoted. The two fields can be interlaced together to form an interlaced frame.

Figure 3B:
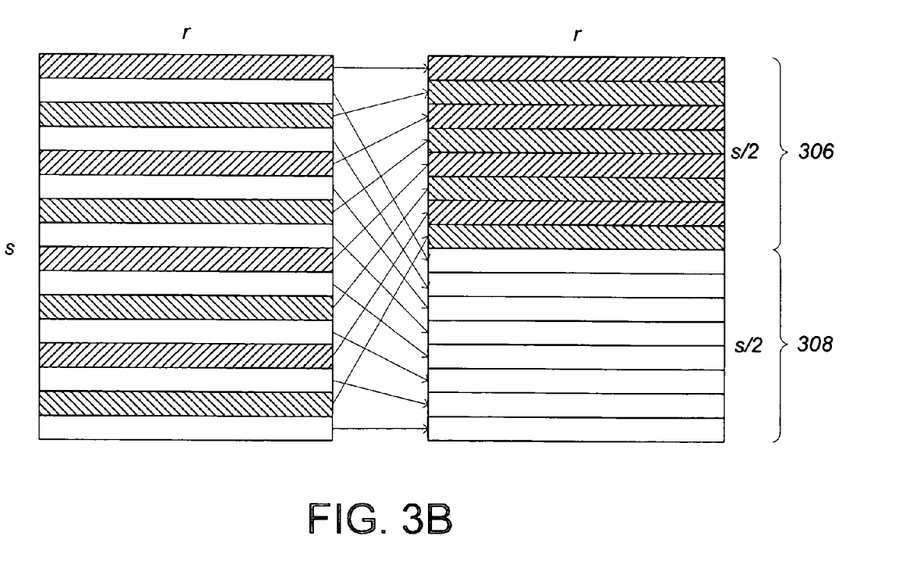
FIG. 3B illustrates one embodiment of the macroblock illustrated in FIG. 3A encoded in field mode.

FIG. 3B illustrates one embodiment of the macroblock 304 encoded in field mode. Accordingly, the macroblock is split into a "top" field 306 and a "bottom" field 308. The macroblock 304 comprises r columns of pixels and s rows of pixels. As previously discussed, in one embodiment, the value of r and s is 16, making the macroblock 304 a 16×16 pixel macroblock. As illustrated in FIG. 3B, every other row of pixels in the macroblock 304 is shaded. The shaded areas represent the rows of pixels in the top field of the macroblock 304 and the unshaded areas represent the rows of pixels in the bottom field of the macroblock 304.

Figure 4A:
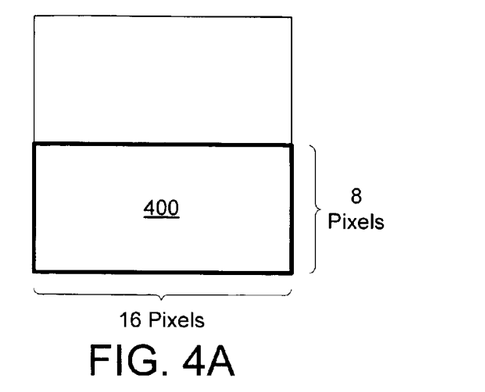
FIGS. 4A-F illustrate various embodiments of possible macroblock subdivisions into smaller sized blocks referred to as sub-macroblocks of various sizes.
Figure 4B:
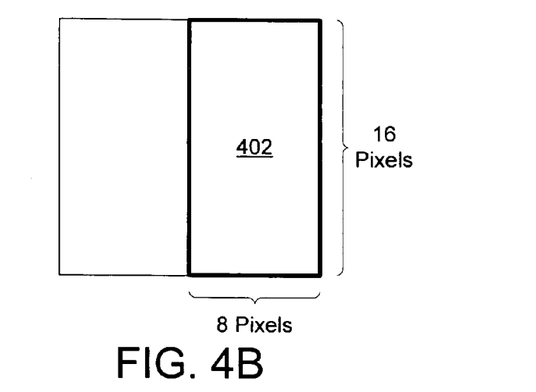
Figure 4C:
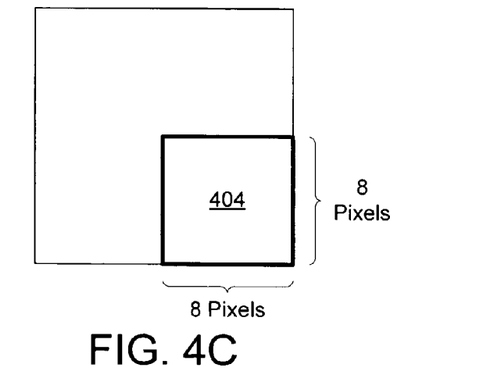
Figure 4D:
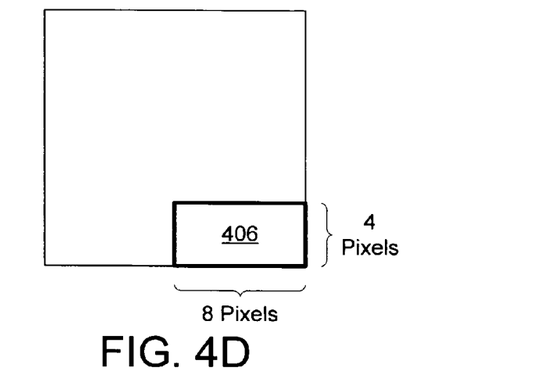
Figure 4E:
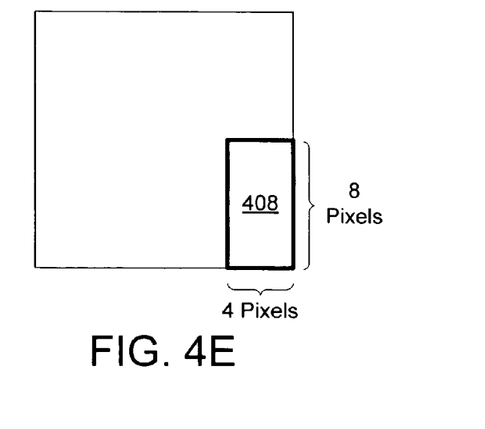
Figure 4F:
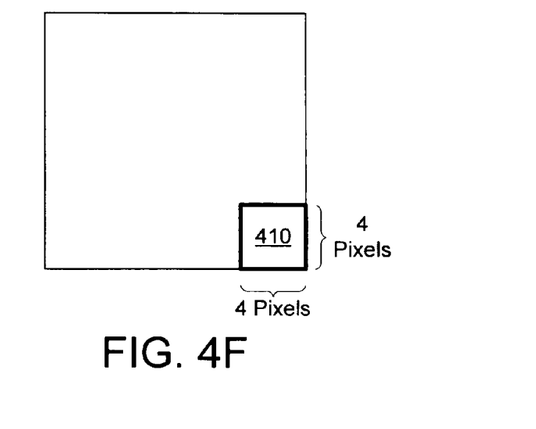

FIGS. 4A-F illustrate various embodiments of possible macroblock subdivisions into smaller sized blocks referred to as sub-macroblocks of various sizes. For example, as shown in FIGS. 4A-F, a macroblock can be further divided into block sizes of 16×8 pixels (FIG. 4A; 400), 8×16 pixels (FIG. 4B; 402), 8×8 pixels (FIG. 4C; 404), 8×4 pixels (FIG. 4D; 406), 4×8 pixels (FIG. 4E; 408), or 4×4 pixels (FIG. 4F; 410). The smaller block sizes may be preferable in some applications that use a temporal prediction with the motion compensation algorithm. In accordance with the H.264 standard, as previously discussed, a macroblock may comprise a block of 16×16 luma pixels. Each 8×8 pixel block (FIG. 4C) may be referred to as sub-macroblock and may be further divided into 8×4, 4×8, and 4×4 sub-macroblocks, for example. In accordance with the H.264 standard, the motion compensation prediction from the reference pictures may be used in the two reference lists. The minimum unit to apply motion compensation referred by different pictures is the sub-macroblock having an 8×8 pixel block size. The embodiments, however, are not limited to the elements or the arrangement shown or described in FIGS. 4A-F.

Figure 5A:
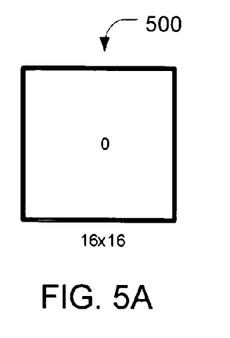
FIGS. 5A-G illustrate various embodiments of block patterns in a macroblock.
Figure 5B:
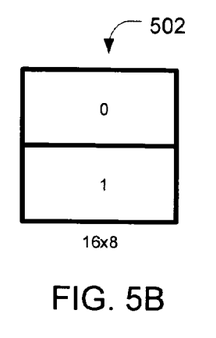
Figure 5C:
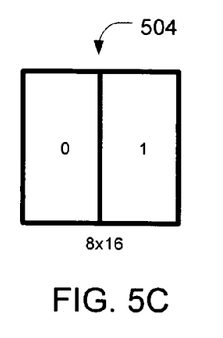

FIGS. 5A-G illustrate various embodiments of block patterns in a macroblock. The number inside the block indicates the block index inside the macroblock. For example, as shown in FIG. 5A, a macroblock 500 may comprise a single (unpartitioned) block of 16×16 luma pixels and have a block index of 0. In some standards, a macroblock may be further be partitioned into other block sizes. As shown in FIG. 5B, a macroblock 502 may be partitioned horizontally and may comprise two blocks of 16×8 luma pixels with respective block indices of 0 and 1. As shown in FIG. 5C, a macroblock 504 may be partitioned vertically and may comprise two blocks of 8×16 luma pixels with respective indices of 0 and 1.

Figure 5D:
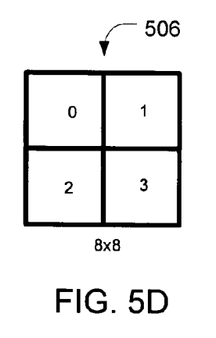
Figure 5E:
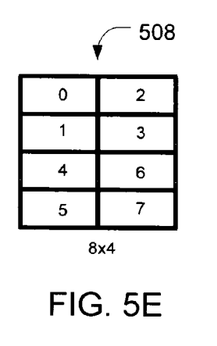
Figure 5F:
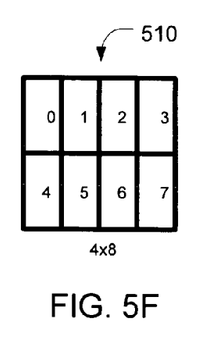
Figure 5G:
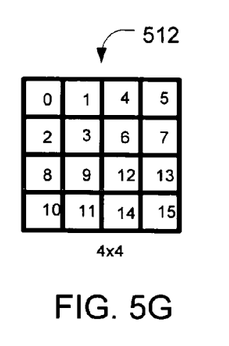

As shown in FIG. 5D, a macroblock 506 may be portioned into four equal blocks of 8×8 luma pixels with respective indices of 0, 1, 2, and 3. In accordance with the H.264 standard, each 8×8 block shown on FIG. 5D, which may be referred to a sub-macroblock, may be further partitioned into smaller blocks. Accordingly, as shown in FIG. 5E, a macroblock 508 may be partitioned into 8×4 luma pixels with respective indices 0, 1, 2, 3, 4, 5, 6, and 7. As shown in FIG. 5F, a macroblock 510 may be partitioned into 4×8 pixels with respective indices 0, 1, 2, 3, 4, 5, 6, and 7. And as shown in FIG. 5G, a macroblock 512 may be partitioned into 4×4 luma pixels with respective indices of 0, 1, 2, 3, 4, 5, 6, 7, 8, 9, 10, 11, 12, 13, 14, and 15. The embodiments, however, are not limited to the elements or the arrangement shown or described in FIGS. 5A-G.

Figure 6A:
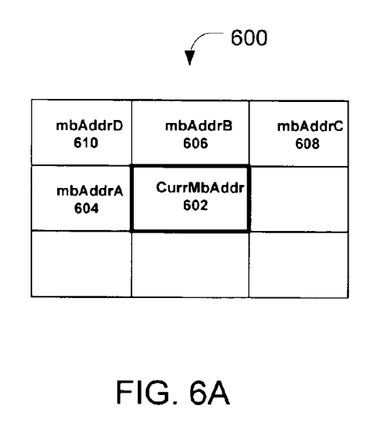
FIGS. 6A-B are diagrams that illustrate the relative location of neighboring macroblocks relative to a current macroblock.
Figure 6B:
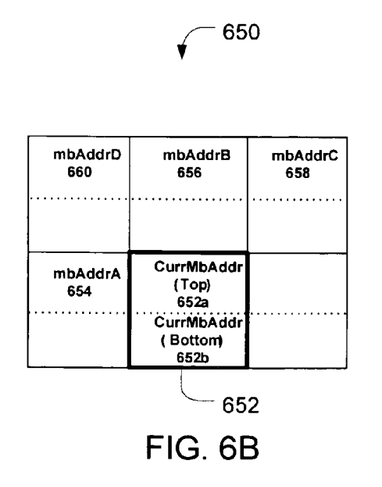

FIGS. 6A-B are diagrams that illustrate the relative location of neighboring macroblocks relative to a current macroblock. To achieve higher coding efficiency utilizing the spatial correlation between blocks, video codec standards usually permit the use of previously decoded neighboring blocks to decode the current macroblock. Specifically, the coding parameters for the reconstruction of the motion vector, intra prediction, content adaptive binary arithmetic coding (CABAC), and reconstruction of a macroblock property of the current macroblock require the associated information from the previously reconstructed adjacent macroblocks.

FIG. 6A is a diagram 600 that illustrates the location of a current macroblock 602 and neighboring macroblocks 604, 606, 608, and 610 (604-610) relative to a current macroblock 602 for the non-MBAFF coding mode. As shown in FIG. 6A, the current macroblock 602 has an address CurrMbAddr. The four neighboring macroblocks 604, 606, 608, 610 have respective addresses mbAddrA, mbAddrB, mbAddrC, and mbAddrD.

FIG. 6B is a diagram 650 that illustrates the location of a current macroblock pair 652 and neighboring macroblock pairs 654, 656, 658, 660 (654-660) for the MBAFF coding mode. As shown in FIG. 6B, the current macroblock pair 652 has an address CurrMbAddr. It will be appreciated by those skilled in the art that in the MBAFF coding mode, each macroblock pair 652, 654, 656, 658, 660 is partitioned and comprises "top" and "bottom" portions. Accordingly, the current macroblock pair 652 at address CurrMbAddr comprises a top portion 652a and a bottom portion 652b. The four neighboring macroblock pairs 654, 656, 658, 660 have respective addresses mbAddrA, mbAddrB, mbAddrC, and mbAddrD. The addresses mbAddrA, mbAddrB, mbAddrC, and mbAddrD for the respective neighboring macroblock pairs 654, 656, 658, 660 refer to the top macroblock of the neighboring macroblock pairs 654, 656, 658, 660.

Figure 7A:
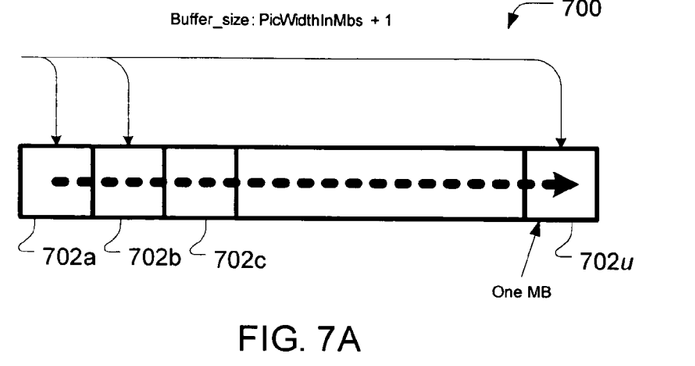
FIG. 7A illustrates one embodiment of a neighbor data buffer (NDB) structure for non-MBAFF coding modes
Figure 7B:
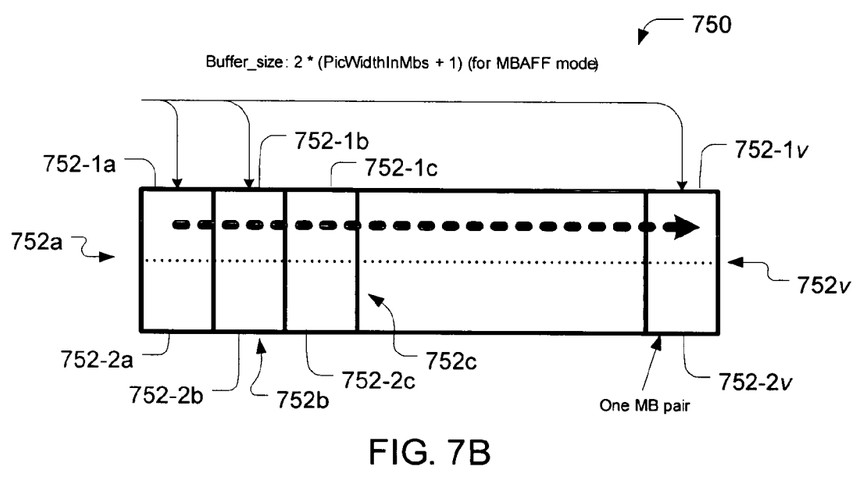
FIG. 7B illustrates one embodiment of neighbor data buffer (NDB) structures for MBAFF coding modes.
Figure 7C:
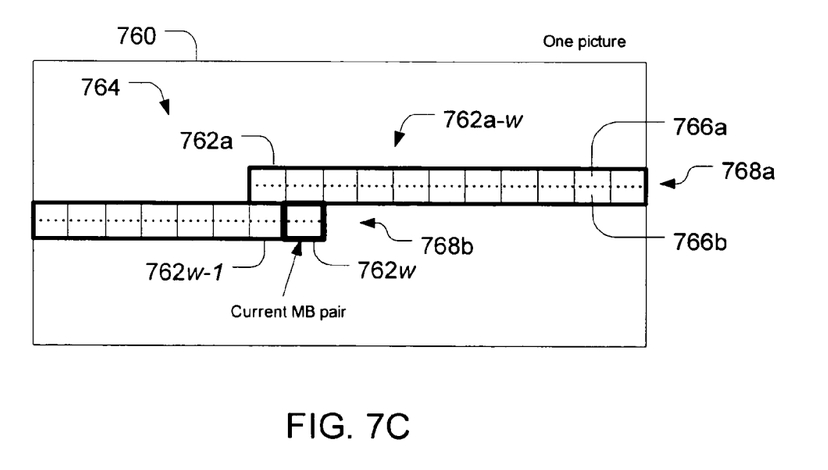
FIG. 7C illustrates a diagram of one embodiment of a picture illustrating the location of macroblock pairs stored in a data buffer for an MBAFF coding mode.

FIGS. 7A-C illustrate various embodiments of neighbor data buffer (NDB) structures for non-MBAFF and MBAFF coding modes similar to the buffer 222 defined storage/transmission medium 206 or memory 220. FIG. 7A illustrates one embodiment of a structure for a data buffer 700 for the non-MBAFF coding mode. The buffer 700 may store multiple macroblocks 702a-u, where u is any integer. The size of the buffer 700 may be given by PicWidthInMbs+1.

FIG. 7B illustrates one embodiment of a structure for a data buffer 750 for the MBAFF coding mode. The size of the buffer 750 may be given by 2*(PicWidthInMbs+1). The buffer 750 may store multiple macroblock pairs 752a-v, where v is any integer. As previously discussed, for the MBAFF coding mode, each macroblock 752a-v comprises a respective top portion 752-1a-v and a respective bottom portion 752-2a-v.

Accordingly, with reference to FIGS. 7A, B in decoding a current macroblock, the coding parameter of previously decoded neighboring macroblocks may be accessed as reference prediction data. The sizes of the data buffer 700, 750 structures for the non-MBAFF and the MBAFF coding modes may be represented by equation (1) as follows:

$$\text{Size\_of\_neighbor\_data\_buffer} = \begin{cases} PicWidthInMbs + 1 \text{:for\_non-MBAFF\_mode} \\ 2*(PicWidthInMbs + 1) \text{:for\_MBAFF\_mode} \end{cases} \quad [1]$$

The value PicWidthInMbs may be derived from the syntax element of the video bitstream. In one embodiment, the value PicWidthInMbs may be derived from the syntax element pic_width_in_mbs_minus1 of an H.264 standard video bitstream. For example, for a high definition video of size 1920*1080, the PicWidthInMbs is equal to 120.

FIG. 7C is a diagram of one embodiment of a picture 760 illustrating the location of macroblock pairs 762a-w stored in a data buffer 764 for the MBAFF coding mode, where w is any integer. As previously discussed, in the MBAFF coding mode, each macroblock pair 762a-w comprises respective top 766a and bottom 766b portions. As shown in FIG. 7C, the macroblock pairs 762a-w are stored in the data buffer 764. The data buffer 764 comprises a first row 768a and a second row 768b. The current macroblock 762w is located at the end of the second row 768b of the data buffer 764 and the neighboring macroblocks 762a-(w-1) data is stored in the data buffer 764 for the MBAFF coding mode. The neighboring macroblock data stored in the data buffer 764 for the MBAFF coding mode case are the macroblocks spatially adjacent to the current macroblock 762w, i.e., from the top left macroblock 762a of the first row 768a in succession to the macroblock 762w-1 to the left of the current macroblock 762w in the second row 768b. As illustrated in FIG. 7C, for the MBAFF coding mode, the data buffer 764 is where the neighboring macroblock data is stored starting from the top left macroblock pair 762a in the first row 768a in succession to the macroblock pair 762w-1 to the left of the current macroblock pair 762w in the second row 768b. It should be understood by those skilled in the art that for the FMO/ASO coding modes, the neighboring macroblock data stored in the data buffer 764 is the latest decoded macroblock data in the decoding order, and may not necessarily be the data associated with the spatial adjacent macroblocks 762a-w.

In accordance with the H.264 standard, macroblock control parameters may be stored at every macroblock to manage reference data that may be needed to decode an H.264 standard video bitstream coded in the FMO/ASO coding mode. At the macroblock level, the H.264 standard macroblock control parameters MB_num and Slice_num may be stored for each macroblock. It will appreciated by those skilled in the art that the MB_num macroblock control parameter may be derived from the syntax element first_mb_in_slice at the slice header level and the book-keeping processing at the macroblock level. The Slice_num macroblock control parameter may be derived from the book-keeping process at every slice by decoding the end_of_sequence (EOS), start_of_picture (SOP), and start_of_slice (SOS) defined constants.

Operations for the above described embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 8:
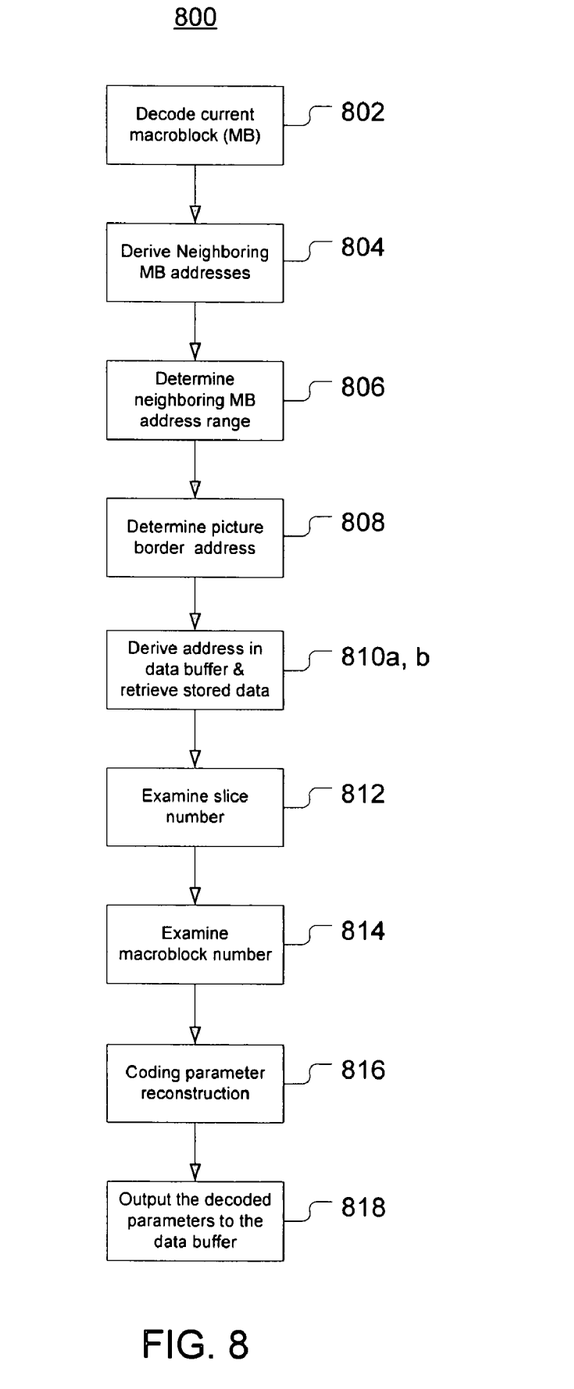
FIG. 8 illustrates one embodiment of a logic flow.

FIG. 8 illustrates one embodiment of a logic flow 800. The logic flow 800 may be representative of the operations executed by one or more embodiments described herein. The operations may be executed to manage the processing of reference data and the processing of the coding parameters reconstruction at the macroblock level for H.264 standard video coded or compressed in the FMO/ASO mode. The embodiments, however, are not limited to the elements or the arrangement shown or described in FIG. 8.

Accordingly, the operations described in the logic flow 800 provide a method to decode H.264 standard video bitstream in the FMO/ASO coding mode. Unlike conventional methods that use a global data buffer to hold the reference data for an entire picture, the various described embodiments provide a data buffer (e.g., data buffer 764) having a buffer size of approximately 3% (or approximately 2.98%, for example) for high definition (HD) video compared to other approaches utilized in JM software, for example. Stored macroblock control parameters and the associated macroblock level management processing are provided so that the task of video decoding FMO/ASO video may be executed in the macroblock decoding order efficiently. The various described embodiments may be applied to many hardware/software based architectures, including, in one example, the H.264 standard Intel Performance Primitive (IPP) library made by Intel Corporation. In addition, the various described embodiments provide an architecture which may be scalable to other H.264 standard based video codecs, for example, as well as other compression or video codec standards.

With reference to the logic flow 800 in FIG. 8, an H.264 standard digital video signal sequence 212 comprising a video bitstream may be conveyed from any one of the video source 202, the video encoder 204, and the storage/transmission medium 206 to the video decoder 208. The video decoder 208 receives the H.264 standard bitstream and processes a slice comprising multiple macroblocks. At the start of the macroblock level management processing the video decoder 208 decodes (802) either the non-MBAFF current macroblock 602 or the MBAFF current macroblock 652. At the macroblock 602, 652 level, the video decoder 208 begins to process the reference data and the coding parameters to manage and reconstruct an H.264 video coded in the FMO/ASO mode.

The video decoder 208 derives (804) the neighboring macroblock addresses for either the non-MBAFF or the MBAFF case.

For the non-MBAFF case, for example, for the current macroblock 602 at current address currMbAddr, the decoder 208 derives the addresses mbAddrA, mbAddrB, mbAddrC, and mbAddrD of the respective neighboring macroblocks 604, 606, 608, 610. The neighboring macroblock addresses mbAddrA, mbAddrB, mbAddrC, mbAddrD of the respective neighboring macroblocks 604, 606, 608, 610 may be derived to locate and/or retrieve the stored reference neighboring macroblock properties in accordance with the following formulas:

neighbor_MB_address(non − *MBAFF*) [2]

$$\begin{cases} mbAddrA = CurrMbAddr - 1 \\ mbAddrB = CurrMbAddr - PicWidthInMbs \\ mbAddrC = CurrMbAddr - PicWidthInMbs + 1 \\ mbAddrD = CurrMbAddr - PicWidthInMbs - 1 \end{cases}$$

Where mbAddrA, mbAddrB, mbAddrC, and mbAddrD are the neighboring macroblock addresses of the respective neighboring macroblocks 604, 606, 608, 610 for the current macroblock 602 at current address currMbAddr and where PicWidthInMbs is the size of the buffer 700 and the value may be derived from the syntax element of the video bitstream.

For the MBAFF case, for example, for the current macroblock 652 at the current address currMbAddr, the decoder 208 derives (804) the addresses mbAddrA, mbAddrB, mbAddrC, and mbAddrD of the respective neighboring macroblocks 654, 656, 658, 660 for both the top and bottom portions of each of the macroblocks 652-660. The addresses mbAddrA, mbAddrB, mbAddrC, mbAddrD of the respective neighboring macroblocks 654, 656, 658, 660 may be derived to locate and/or retrieve the stored reference neighboring macroblock properties in accordance with the following formulas:

neighbor_MB_address(*MBAFF*) [3]

$$\begin{cases} mbAddrA = 2*(CurrMbAddr/2 - 1) \\ mbAddrB = 2*(CurrMbAddr/2 - PicWidthInMbs) \\ mbAddrC = 2*(CurrMbAddr/2 - PicWidthInMbs + 1) \\ mbAddrD = 2*(CurrMbAddr/2 - PicWidthInMbs - 1) \end{cases}$$

Where mbAddrA, mbAddrB, mbAddrC, and mbAddrD are the neighboring macroblock addresses of the respective neighboring macroblocks 654, 656, 658, 660 for the current macroblock 652 at current address currMbAddr and, as previously discussed, the size of the buffer 750 may be given by 2*(PicWidthInMbs+1). The value of PicWidthInMbs may be derived from the syntax element of the video bitstream.

The video decoder 208 determines (806) the neighboring macroblock address range. For every neighboring macroblock address mbAddrA, mbAddrB, mbAddrC, and mbAddrD derived from equation 2 or 3, the decoder 208 performs the address range determination operation to validate the availability of the neighboring macroblocks in accordance with the following equation:

$$UnavailabilityX = \begin{cases} 1, & \text{if } (mbAddrX < 0) \| (mbAddrX > PicInMbs) \\ 0, & \text{otherwise} \end{cases} \quad [4]$$

Where X=A, B, C, or D and mbAddrX are the neighboring macroblock addresses and PicInMbs is the number of macroblocks per picture.

The video decoder 208 determines (808) the picture border address. For every neighboring macroblock that passes the availability examination performed in accordance with equation 4, the decoder 208 may perform the address determination operation to invalidate the reference macroblocks that are beyond the picture border in accordance with equation 5 for the non-MBAFF case:

$$UnavailabilityX(MBAFF) = \qquad [5]$$
$$\begin{cases} 1, & \text{If } (((CurrMbAddr/2)\% \ PicWidthInMbs) = 0)(\text{for\_mbAddrA}) \\ 1, & \text{If } (((CurrMbAddr/2) < PicWidthInMbs) = 1)(\text{for\_mbAddrB}) \\ 1, & \text{If } (((CurrMbAddr/2 + 1)\% \ PicWidthInMbs) = 0)(\text{for\_mbAddrC}) \\ 1, & \text{If } (((CurrMbAddr/2)\% \ PicWidthInMbs) = 0)(\text{for\_mbAddrD}) \\ 0, & \text{otherwise} \end{cases}$$

Where X=A, B, C, and D, CurrMbAddr is the address of the current macroblock 602, PicWidthInMbs is the size of the buffer 700 and the value of PicWidthInMbs may be derived from the syntax element of the video bitstream.

And in accordance with equation 6 for the MBAFF case:

$$UnavailabilityX(non - MBAFF) \qquad [6]$$
$$\begin{cases} 1, & \text{If } ((CurrMBAddr \% \ PicWidthInMbs) = 0)(\text{for\_mbAddrA}) \\ 1, & \text{If } ((CurrMBAddr < PicWidthInMbs) = 1)(\text{for\_mbAddrB}) \\ 1, & \text{If } (((CurrMbAddr + 1)\% \ PicWidthInMbs) = 0)(\text{for\_mbAddrC}) \\ 1, & \text{If } ((CurrMbAddr \% \ PicWidthInMbs) = 0)(\text{for\_mbAddrD}) \\ 0, & \text{otherwise} \end{cases}$$

Where X=A, B, C, and D, CurrMbAddr is the address of the current macroblock 652, 2*(PicWidthInMbs+1) is the size of the buffer 750, and the value of PicWidthInMbs may be derived from the syntax element of the video bitstream.

The video decoder 208 derives (810*a*) the address in the neighboring data buffer and retrieves (810*b*) the stored data in the neighboring buffer. For the non-MBAFF case, the video decoder 208 derives (810*a*) the address in the data buffer 700 and retrieves (810*b*) the stored data in the data buffer 700, for example. For the MBAFF case, the video decoder 208 derives (810*a*) the address in the data buffer 750 and retrieves (810*b*) the stored data in the data buffer 750, for example. For every neighboring macroblock address that passes of the availability tests performed in accordance with equations 5 or 6, the address of the neighboring data buffer is calculated to retrieve the stored macroblock control data and validate the availability of the neighboring macroblock. In one embodiment, the macroblock control data may comprise the slice number and the macroblock number. The address calculation may be performed in accordance with equation 7:

mbAddrX_in_neighbor_data_buffer=mbAddrX%Size_of_neighboring_data_bufferX [7]

Where X=A, B, C, or D and mbAddrX_in_neighbor_data_bufferX is the address of the neighboring data buffers for the neighboring macroblocks 602-610 (non-MBAFF case) or the neighboring macroblocks 652-660 (MBAFF case).

The video decoder 208 examines (812) the slice number. Using the derived addresses of the neighboring data buffers mbAddrX_in_neighbor_data_bufferX (X=A, B, C, and D), the decoder 208 retrieves the stored parameter from the neighboring data buffer. The retrieved parameters, i.e., the slice number and the macroblock number, may be denoted as slice_num(X) and mb_num(X), where X=A, B, C, and D, for each of the neighboring data buffers. The retrieved slice number is compared to the slice number of the current macroblock slice_num(CurrMB) to validate the availability of the neighboring macroblocks. The slice number examination may be performed or executed in accordance with equation 8:

$$UnavailabilityX = \begin{cases} 1, & \text{if (slice\_num}(CurrMB) \neq \text{slice\_num}(X)) \\ 0, & \text{otherwise} \end{cases} \quad [8]$$

The video decoder 208 examines (814) the macroblock number. For the neighboring macroblock passes of the slice number examination in accordance with equation 8, the macroblock number distance examination may be used to compare the retrieved mb_num(x) to the mb_num of the current macroblock mb_num(CurrMB) in accordance with equation 9 for the non-MBAFF case:

$$UnavailabilityX(non-MBAFF) \quad [9]$$
$$\begin{cases} 1, & \text{If } ((\text{mb\_num}(CurrMB) - \text{mb\_num}(mbAddrA)) \neq 1) \\ 1, & \text{If } ((\text{mb\_num}(CurrMB) - \text{mb\_num}(mbAddrB)) \neq PicWidthInMbs) \\ 1, & \text{If } ((\text{mb\_num}(Curr(MB) - \text{mb\_num}(mbAddrC)) \neq (PicWidthInMbs-1)) \\ 1, & \text{If } ((\text{mb\_num}(CurrMB) - \text{mb\_num}(mbAddrD)) \neq (PicWidthInMbs+1)) \\ 0, & \text{otherwise} \end{cases}$$

And in accordance with equation 10 for the MBAFF case:

$$UnavailabilityX(MBAFF) \quad [10]$$
$$\begin{cases} 1, & \text{If } (\text{mb\_num}(CurrMB) - \text{mb\_num}(mbAddrA)) \neq 2) \\ 1, & \text{If } ((\text{mb\_num}(CurrMb) - \text{mb\_num}(mbAddrB)) \neq 2*PicWidthInMbs) \\ 1, & \text{If } ((\text{mb\_num}(CurrMB) - \text{mb\_num}(mbAddrC)) \neq 2*(PicWidthInMbs-1)) \\ 1, & \text{If } ((\text{mb\_num}(CurrMB) - \text{mb\_num}(mbAddrD)) \neq 2*(PicWidthInMbs+1)) \\ 0, & \text{otherwise} \end{cases}$$

Where the mb_num macroblock control parameter may be derived from the syntax element first_mb_in_slice at the slice header level and the book-keeping processing at the macroblock level.

The video decoder 208 reconstructs (816) the coding parameter. The reconstruction of the coding parameter may be performed using the availability information about the neighboring macroblocks obtained from Equations 4, 5, 6, 8, 9, and 10. Accordingly, the decoder 208 can begin the coding process as intra prediction, inter prediction, and deblocking. This coding process is described in the H.264 standard specification and is out of the scope of the described embodiments. The coding parameters such as, for example, intra prediction value, motion vectors, reference picture index, prediction flag, and deblocking filter strength may be reconstructed after the coding process.

The video decoder 208 outputs (818) the decoded parameters to the data buffer 700, 750. To output the decoded macroblock parameters to the neighboring data buffer the decoder 208 stores the decoded information of the current macroblock into the neighbor data buffer as the reference data. The stored decoded information may be used for decoding the future macroblocks. The address to be outputted in the neighboring data buffer may be arranged in a consistent manner. This arrangement may enable the data to be retrieved appropriately when decoding later macroblocks. The output address of the current macroblock in the neighboring address may be calculated in accordance with equation 11:

CurrMB_Addr_in_neighbor_data_buffer=CurrMbAddr%Size_of_neighboring_data_buffer [11]

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

The functions of the various described embodiments shown in the figures including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), programmable logic devices (PLD), field programmable gate array (FPGA), read-only memory (ROM) for storing software, random access memory (RAM), and non-volatile storage. Other hardware, conventional and/or custom, may also be included. Similarly, any functional blocks shown in the figures are conceptual only. Their function may be carried out through the operation of program logic, through dedicated logic, through the interaction of program control and dedicated logic, or even manually, the particular technique being selectable by the implementer as more specifically understood from the context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, ASIC, PLD, DSP, FPGA, logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

For the sake of presentation, the description may use terms like "obtain," "determine," "derive," "store," "adjust," and the like to describe computer operations in a computing environment. These terms are high-level abstractions for operations performed by a computer and/or processor and should not be confused with acts performed by a human being. The actual computer and/r processor operations corresponding to these terms may vary depending on implementation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A video decoder, comprising:
a processor to store coding parameters of one or more neighboring macroblocks in a data buffer, wherein said neighboring macroblocks are previously decoded macroblocks and are adjacent to a current macroblock; store control parameters for each of said one or more neighboring macroblocks in said data buffer; derive addresses of said neighboring macroblocks relative to said current macroblock; determine a neighboring macroblock address range for each of said derived neighboring macroblock addresses; determine whether said neighboring macroblock is available based on said determined neighboring macroblock address range; retrieve neighboring macroblock properties from said derived macroblock addresses; reconstruct coding parameters for said current macroblock using availability information associated with said neighboring macroblocks; and store said reconstructed coding parameters for said current macroblock in said data buffer.

2. The apparatus of claim 1, wherein said processor is to determine a neighboring macroblock address picture border for each of said available derived neighboring macroblock; and determine whether said available derived neighboring macroblock is available based on said determined neighboring macroblock address picture border.

3. The apparatus of claim 2, wherein said processor is to derive an address in said data buffer associated with said neighboring macroblock for each of said available derived neighboring macroblocks within said neighboring macroblock address picture border; and retrieve neighboring macroblock control data stored in said derived address in said data buffer.

4. The apparatus of claim 3, wherein said processor is to retrieve said stored neighboring macroblock coding parameters from a neighboring macroblock associated with said derived address in said data buffer; compare a slice number parameter of said retrieved neighboring macroblock coding parameters with a slice number parameter of said current macroblock; and determine whether said neighboring macroblock is available based on said comparison of said slice number parameters.

5. The apparatus of claim 4, wherein said processor is to compare a macroblock number parameter of said retrieved neighboring macroblock coding parameters with a macroblock number parameter of said current macroblock; and determine whether said neighboring macroblock is available based on said comparison of said macroblock number parameters.

6. The apparatus of claim 1, wherein said processor is to reconstruct said coding parameters for the flexible macroblock ordering (FMO) and arbitrary slice ordering (ASO) modes of an H.264 bitstream.

7. The apparatus of claim 6, wherein said processor is to provide said stored macroblock control parameters and macroblock level management process to access/store said macroblock control parameters.

8. A system, comprising:
a video decoder comprising a processor to store coding parameters of one or more neighboring macroblocks in a data buffer, wherein said neighboring macroblocks are previously decoded macroblocks and are adjacent to a current macroblock; store control parameters for each of said one or more neighboring macroblocks in said data buffer; derive addresses of said neighboring macroblocks relative to said current macroblock; determine a neighboring macroblock address range for each of said derived neighboring macroblock addresses; determine whether said neighboring macroblock is available based on said determined neighboring macroblock address range; retrieve neighboring macroblock properties from said derived macroblock addresses; reconstruct coding parameters for said current macroblock using availability information associated with said neighboring macroblocks; and store said reconstructed coding parameters for said current macroblock in said data buffer; and
a memory coupled to said video decoder, said memory to store digital video information to store said data buffer.

9. The system of claim 8, comprising:
a video encoder coupled to said video decoder;
wherein said video encoder is to receive a video input frame and provide an encoded video bitstream to said decoder.

10. The system of claim 9, wherein said video encoder is to encode said video input frame according to the H.264 standard specification and said video decoder is to decode said video bitstream according to the H.264 standard specification.

11. The system of claim 8, wherein said processor is to reconstruct said coding parameters for the flexible macroblock ordering (FMO) and arbitrary slice ordering (ASO) modes of an H.264 bitstream.

12. The system of claim 11, wherein said processor is to provide said stored macroblock control parameters and macroblock level management process to access/store said macroblock control parameters.

13. A method, comprising:
storing coding parameters of one or more neighboring macroblocks in a data buffer, wherein said neighboring macroblocks are previously decoded macroblocks and are adjacent to a current macroblock;
storing control parameters for each of said one or more neighboring macroblocks in said data buffer;
deriving addresses of said neighboring macroblocks relative to said current macroblock;
determining a neighboring macroblock address range for each of said derived neighboring macroblock addresses;
determining whether said neighboring macroblock is available based on said determined neighboring macroblock address range;
retrieving neighboring macroblock properties from said derived macroblock addresses;
reconstructing coding parameters for said current macroblock using availability information associated with said neighboring macroblocks; and
storing said reconstructed coding parameters for said current macroblock in said data buffer.

14. The method of claim 13, comprising:
determining a neighboring macroblock address picture border for each of said available derived neighboring macroblock; and
determining whether said available derived neighboring macroblock is available based on said determined neighboring macroblock address picture border.

15. The method of claim 14, comprising:
deriving an address in said data buffer associated with said neighboring macroblock for each of said available derived neighboring macroblocks within said determined neighboring macroblock address picture border; and
retrieving neighboring macroblock control data stored in said derived address in said data buffer.

16. The method of claim 15, comprising:
retrieving said stored neighboring macroblock coding parameters from a neighboring macroblock associated with said derived address in said data buffer;
comparing a slice number parameter of said retrieved neighboring macroblock coding parameters with a slice number parameter of said current macroblock; and
determining whether said neighboring macroblock is available based on said comparison of said slice number parameters.

17. The method of claim 16, comprising:
comparing a macroblock number parameter of said retrieved neighboring macroblock coding parameters with a macroblock number parameter of said current macroblock; and
determining whether said neighboring macroblock is available based on said comparison of said macroblock number parameters.

18. The method of claim 13, comprising:
reconstructing said coding parameters for the flexible macroblock ordering (FMO) and arbitrary slice ordering (ASO) modes of an H.264 bitstream.

19. The method of claim 18, comprising:
providing said stored macroblock control parameters and macroblock level management process to access/store said macroblock control parameters.

20. An article comprising a machine-readable storage medium containing instructions that if executed enable a system to store coding parameters of one or more neighboring macroblocks in a data buffer, wherein said neighboring macroblocks are previously decoded macroblocks and are adjacent to a current macroblock; store control parameters for each of said one or more neighboring macroblocks in said data buffer; derive addresses of said neighboring macroblocks relative to said current macroblock; determine a neighboring macroblock address range for each of said derived neighboring macroblock addresses; determine whether said neighboring macroblock is available based on said determined neighboring macroblock address range; retrieve neighboring macroblock properties from said derived macroblock addresses; reconstruct coding parameters for said current macroblock using availability information associated with said neighboring macroblocks; and store said reconstructed coding parameters for said current macroblock in said data buffer.

21. The article of claim 20, further comprising instructions that if executed enable the system to determine a neighboring macroblock address picture border for each of said available derived neighboring macroblock; and determine whether said available derived neighboring macroblock is available based on said determined neighboring macroblock address picture border.

22. The article of claim 21, further comprising instructions that if executed enable the system to derive an address in said data buffer associated with said neighboring macroblock for each of said available derived neighboring macroblocks within said neighboring macroblock address picture border; and retrieve neighboring macroblock control data stored in said derived address in said data buffer.

23. The article of claim 22, further comprising instructions that if executed enable the system to retrieve said stored neighboring macroblock coding parameters from a neighboring macroblock associated with said derived address in said data buffer; compare a slice number parameter of said retrieved neighboring macroblock coding parameters with a slice number parameter of said current macroblock; and determine whether said neighboring macroblock is available based on said comparison of said slice number parameters.

24. The article of claim 22, further comprising instructions that if executed enable the system to compare a macroblock number parameter of said retrieved neighboring macroblock coding parameters with a macroblock number parameter of said current macroblock; and determine whether said neighboring macroblock is available based on said comparison of said macroblock number parameters.

25. The article of claim 20, further comprising instructions that if executed enable the system to reconstruct said coding parameters for the flexible macroblock ordering (FMO) and arbitrary slice ordering (ASO) modes of an H.264 bitstream.

26. The article of claim 25, further comprising instructions that if executed enable the system to provide said stored macroblock control parameters and macroblock level management process to access/store said macroblock control parameters.

* * * * *